United States Patent [19]

Ishizaki et al.

[11] Patent Number: 5,126,103
[45] Date of Patent: Jun. 30, 1992

[54] PROCESS FOR MODIFYING POROUS MATERIAL HAVING OPEN CELLS

[75] Inventors: Kozo Ishizaki, Nagaoka; Shojiro Okada, Kagawa; Takao Fujikawa, Kobe; Atsushi Takata, Nagaoka, all of Japan

[73] Assignee: Kabushiki Kaisha Kobeseikosho, Hyogo, Japan

[21] Appl. No.: 667,407

[22] PCT Filed: Aug. 6, 1990

[86] PCT No.: PCT/JP90/01003
§ 371 Date: Apr. 8, 1991
§ 102(e) Date: Apr. 8, 1991

[87] PCT Pub. No.: WO91/01834
PCT Pub. Date: Feb. 21, 1991

[30] Foreign Application Priority Data
Aug. 7, 1989 [JP] Japan .................. 1-205421

[51] Int. Cl.$^5$ ................................ G22F 3/00
[52] U.S. Cl. ............................. 419/2; 419/49; 501/80
[58] Field of Search ............ 419/2, 49; 501/80

[56] References Cited

U.S. PATENT DOCUMENTS

| | | | |
|---|---|---|---|
| 4,644,942 | 2/1987 | Sump | 419/2 |
| 4,659,546 | 4/1987 | Kearns | 419/2 |

FOREIGN PATENT DOCUMENTS

| | | |
|---|---|---|
| 48-38762 | 11/1973 | Japan . |
| 54-13402 | 1/1979 | Japan . |
| 56-108802 | 8/1981 | Japan . |
| 58-37102 | 3/1983 | Japan . |
| 59-205404 | 11/1984 | Japan . |

Primary Examiner—Stephen J. Lechert, Jr.
Attorney, Agent, or Firm—Oblon, Spivak, McClelland, Maier & Neustadt

[57] ABSTRACT

The invention provides a process for modifying a ceramic and/or metallic porous material having open cells necessary for the material to serve the function of gas diffusing materials, filters or the like. The porous material is subjected to hot isostatic pressing at a temperature at which the base portion of the porous material softens or melts to compact or homogenize the base portion.

3 Claims, 1 Drawing Sheet

PROCESS FOR MODIFYING POROUS MATERIAL HAVING OPEN CELLS

TECHNICAL FIELD

The present invention relates to a process for modifying a ceramic and/or metallic porous material having open cells necessary for the material to serve the function of a gas diffusing material, filter material or the like.

BACKGROUND ART

The cells forming porous materials include open cells and closed cells. The closed cells, the latter, are completely held out of communication with the outside, while the former, i.e., the open cells, are predominantly through voids permitting the passage of fluids therethrough and also include open voids having an inlet but no outlet. The ratio of the volume of open cells of the porous material to the volume of its mass will be referred to as an open cell ratio, which can be determined by experiments.

Processes for producing porous materials having such open cells (hereinafter referred to as "open-cell porous materials") include, first, a process comprising sintering a green molding of ceramic and/or metallic particles or fibers while producing open cells at the interstices between the particles or fibers, second, a process for vitrifying a green molding of ceramic and/or metallic particles and a vitrifying binder admixed with the particulate material while producing open cells at the interstices between the particles, third, a process for sintering a green molding of ceramic particles and a large quantity of combustible organic material admixed therewith while burning the organic material to form open cells, fourth, a process comprising heat-treating a melt of glass composed of a component insoluble in a chemical and a component soluble therein at a phase separation temperature and further dissolving out the soluble component with the chemical for removal to form open cells, etc.

These open-cell porous materials must have satisfactory gas or liquid permeability, which in turn requires a high open cell ratio. Further these open-cell porous materials are used under versatile conditions which require high strength. However, the conventional production techniques have encountered difficulties in giving both a high open cell ratio and high strength to open-cell porous materials since these characteristics are in conflict with each other.

Generally in producing open-cell porous materials, the open cell ratio increases but the strength decreases when the sintering temperature or vitrifying temperature is lowered, whereas the strength improves but the open cell ratio decreases when the sintering temperature or vitrifying temperature is conversely raised. On the other hand, the open cell ratio increases but the strength decreases when the molding density of green products is lowered, whereas a higher molding density results in improved strength but a decreased open cell ratio. Further when the proportion of the combustible organic material or of the soluble component of glass serving as a cell forming agent is increased, the open cell ratio increases but the strength lowers, whereas a decreased proportion of the cell forming agent entails improved strength but a decreased open cell ratio.

Thus, in the conventional techniques for producing open-cell porous materials, the increase in the open cell ratio and the improvement in the strength are conflicting characteristics. An object of the present invention, which has been accomplished in view of this problem, is to provide a process for giving an open-cell porous material an increased open cell ratio and improved strength.

DISCLOSURE OF THE INVENTION

To fulfill the above object, the open-cell porous material modifying process of the present invention is characterized in that a ceramic and/or metallic porous material having open cells is subjected to hot isostatic pressing at a temperature at which the base portion of the porous material softens or melts to compact or homogenize the base portion.

The material to be thus treated is preferably a porous material having an open cell ratio of 20 to 90%. As a hot isostatic pressing condition, the treating pressure is preferably not lower than 0.1 MPa to not higher than 1000 MPa. Further the preferred treating temperature is within the range of ±20% in terms of absolute temperature based on the sintering temperature or vitrifying temperature of the porous material at atmospheric pressure.

According to the modifying process of the present invention, a porous material having open cells is subjected to an HIP treatment at a predetermined temperature. This treatment eliminates closed cells, internal cracks, segregation and like defects in the base portion of the porous material to compact or homogenize the base portion. This gives the porous material an improved open cell ratio and improved permeability to gases or liquids and ensures reduced resistance to the passage of gases or liquids, permitting the material to achieve a higher efficiency when used for diffusing a gas into a liquid or for filtering a liquid. The treatment also improves the strength of the porous material, renders the material less prone to troubles due to damage or break and gives a longer life to the material. The treatment further diminishes phenomena such as the release or dissolving-out of impurities from the cells walls. These features make the open-cell porous material usable for wider applications to achieve very great advantages in various industrial fields.

BEST MODE OF CARRYING OUT THE INVENTION

Embodiments of the present invention will be described below with reference to the drawings.

Figure 1:
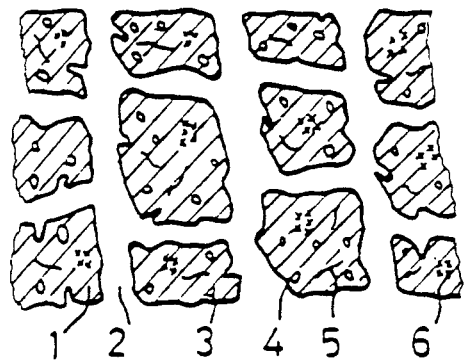
FIG. 1 is a conceptual diagram showing the structure in section of a pretreated material for use in the present invention showing a base portion 1, through voids 2, closed cells 3, open voids 4, internal cracks 5 and segregated portions 6.

FIG. 1 shows a base portion 1, through voids 2, closed cells 3, open voids 4, internal cracks 5 and segregated portions 6. Open-cell porous materials (hereinafter referred to as "pretreated materials") have open cells which are predominantly continuously extending through voids 2, so that when the material is treated by hot isostatic pressing (hereinafter referred to as "HIP"), a pressure medium having a high pressure freely flows into and fills up the through voids 2. Since the HIP treatment is conducted at a temperature at which the base portion 1 of the pretreated material softens or melts, the treatment rapidly compacts and homogenizes the base portion 1, eliminating the defects in the base portion 1 and giving the material an increased open cell ratio and improved strength at the same time.

More specifically, a pressure medium having a high pressure and a high temperature is forced into the through voids 2, acting on the base portion 1 to collapse the closed cells 3 and join them with the through voids 2, giving an increased open cell ratio and compacting the base portion 1. The open voids 4 are also subjected to the same action as the through voids 2. The internally cracked portions 5 of the base structure soften or melt at the high temperature and high pressure, become liable to flow plastically and fuse to each other on contact. The segregated portions 6 actively diffuses through the base portion at the high temperature and high pressure to form a homogenized structure. Owing to these phenomena, the base portion 1 is compacted and improved in strength.

Figure 2:
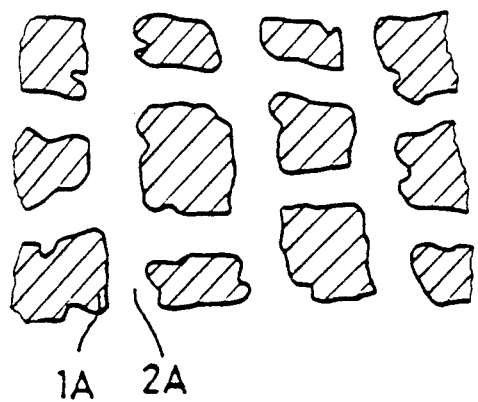
FIG. 2 is a conceptual diagram showing the structure in section of an open-cell porous product as modified according to the invention showing a modified base portion 1A and through voids having increased volume 2A.

FIG. 2 is a conceptual diagram showing in section the structure of the final product prepared by treating the pretreated material according to the invention and having an increased open cell ratio and improved strength. Indicated at 1A is the base portion modified according to the invention, and at 2A through voids which are increased in volume.

The pretreated material is preferably 20 to 90% in open cell ratio. If this ratio is less than 20%, the pressure medium having a high temperature and high pressure encounters difficulty in filling up the through voids 2 and requires a considerable period of time to compact and homogenize the base portion 1. If the ratio exceeds 90%, on the other hand, the material exhibits markedly insufficient strength and low shape retentivity.

The pressure of the pressure medium to be filled into the through voids, which varies with the open cell ratio or void diameter, may be 0.1 MPa when the open cell ratio is relatively high or the cell or void diameter is large. A pressure of 1000 MPa is satisfactory even when the open cell ratio is relatively low or the void diameter is small.

Since the softening temperature or melting temperature is lower at a high pressure than at atmospheric pressure, the treating temperature can be lower than the sintering or vitrifying temperature at atmospheric pressure. Further to compact the base portion at an accelerated velocity, the treating temperature may be higher than the sintering temperature or vitrifying temperature at atmospheric pressure. Even in this case, the higher temperature will not lead to a decreased open cell ratio since the through voids are filled with the high-pressure medium. However, excessively high treating temperatures are likely to permit growth of crystal grains in the base portion to result in reduced strength. Experiments have revealed that the preferred HIP treatment temperature for the pretreated material is in the range of ±20% in terms of absolute temperature based on the sintering temperature or vitrifying temperature at atmospheric pressure.

The pressure medium is selected according to the kind of porous material to be treated. Examples of useful media are argon, nitrogen or like gas which affords an inert atmosphere, hydrogen, carbon monoxide or like gas which provides a reducing atmosphere, oxygen or like gas which gives an oxidizing atmosphere, molten glass, etc. Hydrogen or oxygen is used usually as admixed with argon or like inert gas.

Specific examples are given below. The chemical compositions and mixing ratios are expressed all in wt. %.

EXAMPLE 1

(1) A green molding prepared from an alumina material amenable to sintering, 0.3 μm in mean particle size and having a chemical composition of 96.0% of aluminum oxide, $Al_2O_3$, 1.6% of silicon oxide, $SiO_2$, 1.0% of magnesium oxide, MgO and 1.4% of calcium oxide, CaO was sintered in the air at a temperature of 1573 K for 3 hours to prepare a porous product as a pretreated material.

(2) The pretreated material was treated with argon under an isostatic pressure of 1000 MPa at a temperature of 1523 K for 1 hour.

(3) The treatment resulted in an increased open cell ratio and improved strength as shown in Table 1. The product is useful as a yeast carrier for use in bioreactors.

TABLE 1

| Properties | Bulk density | Bending strength (MPa) | Young's modulus (MPa) | Open cell ratio (%) |
|---|---|---|---|---|
| Before treatment | 2.32 | 23.5 | $45.0 \times 10^3$ | 38.0 |
| After treatment | 2.32 | 35.9 | $69.0 \times 10^3$ | 40.2 |

EXAMPLE 2

(1) A green molding comprising a mixture of 100% of alumina, #80 in particle size and in a molten state, and 14% of finely divided borosilicate frit was vitrified in the air at a temperature of 1473 K for 5 hours to obtain a porous product as a pretreated material.

(2) The pretreated material was treated with a mixed gas of 80% of argon and 20% of oxygen at an isostatic pressure of 30 MPa at a temperature of 1423 K for 2 hours.

(3) The treatment resulted in an increased open cell ratio and improved strength as listed in Table 2. The product is useful for precision filtration of molten metals.

TABLE 2

| Properties | Bulk density | Bending strength (MPa) | Young's modulus (MPa) | Open cell ratio (%) |
|---|---|---|---|---|
| Before treatment | 2.10 | 40.9 | $30.5 \times 10^3$ | 40.6 |
| After treatment | 2.00 | 48.5 | $41.7 \times 10^3$ | 43.9 |

EXAMPLE 3

(1) A green molding prepared from a mixture of 100% of artificial diamond, 170/200 in particle size, and 250% of a finely divided alloy composed of 80.7% of copper Cu, 9.3% of nickel Ni and 10.0% of tin Sn was degreased in the air at a temperature of 723 K for 3 hours to prepare a semi-sintered product as a pretreated material.

(2) The pretreated material was treated with a mixed gas of 99% of argon and 1% of hydrogen at an isostatic pressure of 80 MPa at a temperature of 1123 K for 40 minutes.

(3) The treatment successfully produced a grinding stone of metal-bonded diamond having a high open cell ratio as listed in Table 3.

TABLE 3

| Properties | Bulk density | Bending strength (MPa) | Young's modulus (MPa) | Open cell ratio (%) |
|---|---|---|---|---|
| After treatment | 3.72 | 67.9 | $170 \times 10^3$ | 39.1 |

EXAMPLE 4

(1) A mixture of 100% of sintered aluminum nitride, #80 in particle size, and 40% of a finely divided mixture of 95 moles of powdery aluminum nitride AlN and 5 moles of yttrium oxide $Y_2O_3$ was molded by a cold isostatic press (CIP) at a pressure of 80 MPa to obtain a pretreated material.

(2) The pretreated material was treated with nitrogen at an isostatic pressure of 200 MPa at a temperature of 1973 K for 3 hours.

(3) The treatment successfully produced a heat-conductive ceramic porous material having a high open cell ratio as listed in Table 4.

TABLE 4

| Properties | Bulk density | Bending strength (MPa) | Young's modulus (MPa) | Open cell ratio (%) |
|---|---|---|---|---|
| After treatment | 2.03 | 115 | $142 \times 10^3$ | 38.5 |

EXAMPLE 5

(1) A melt of glass having a chemical composition of 6% of sodium oxide $Na_2O$, 1.0% of lithium oxide $Li_2O$, 23.0% of boron oxide $B_2O_3$, 66.0% of silicon oxide $SiO_2$ and 4.0% of aluminum oxide $Al_2O_3$ was heat-treated at a temperature of 863 K for 100 hours to prepare a phase-separated glass.

(2) The soluble component was dissolved out and removed from the glass with use of 1N HCl at 363 K to prepare an open-cell porous glass as a pretreated material. Considerable quantities of silica gel deposit were found on the cell walls of the pretreated material.

(3) The pretreated material was treated with a mixed gas of 90% of argon and 10% of oxygen at an isostatic pressure of 300 MPa at a temperature of 1223 K for 3 hours.

(4) The treatment resulted in an increased open cell ratio and improved strength as listed in Table 5. The silica gel deposit on the cell walls was absorbed by and made integral with the cell walls to render the wall smooth-surfaced. The product is useful for the desalination of seawater.

TABLE 5

| Properties | Bulk density | Bending strength (MPa) | Young's modulus (MPa) | Open cell ratio (%) |
|---|---|---|---|---|
| Before treatment | 1.42 | 28 | $22.5 \times 10^3$ | 46.5 |
| After treatment | 1.35 | 46 | $32.8 \times 10^3$ | 50.3 |

INDUSTRIAL APPLICABILITY

The porous material modified according to the invention is useful for diffusing various gases and for powder transport air sliders, various filters, carriers for bioreactors, oil-impregnated bearings, high-efficient grinding stones, etc. of which good gas or liquid permeability and high strength are required.

We claim:

1. A process for modifying porous materials having open cells (wherein that) a ceramic and/or metallic porous material having open cells is subjected to hot isostatic pressing at a temperature at which the base portion of the porous material softens or melts to compact or homogenize the base portion.

2. A process for modifying porous materials having open cells as defined in claim 1 wherein the porous material is 20 to 90% in open cell ratio and is subjected to hot isostatic pressing at a pressure of not lower than 0.1 MPa to not higher than 1000 MPa.

3. A process for modifying porous materials having open cells as defined in claim 1 wherein the porous material is subjected to hot isostatic pressing at a temperature within the range of ±20% in terms of absolute temperature based on the sintering temperature or vitrifying temperature of the porous material at atmospheric pressure.

* * * * *

UNITED STATES PATENT AND TRADEMARK OFFICE
CERTIFICATE OF CORRECTION

PATENT NO. : 5,126,103

DATED : June 30, 1992

INVENTOR(S) : ISHIZAKI KOZO, ET AL

It is certified that error appears in the above-identified patent and that said Letters Patent is hereby corrected as shown below:

COLUMN 6, LINE 31 delete "(wherein that)" insert --wherein--

Signed and Sealed this

Twenty-eighth Day of September, 1993

Attest:

BRUCE LEHMAN

*Attesting Officer*    *Commissioner of Patents and Trademarks*